(12) United States Patent
Litvinov et al.

(10) Patent No.: US 6,721,131 B2
(45) Date of Patent: Apr. 13, 2004

(54) COMPOSITE WRITE POLE FOR A MAGNETIC RECORDING HEAD

(75) Inventors: Dmitri Litvinov, Pittsburgh, PA (US); Sakhrat Khizroev, Pittsburgh, PA (US); Billy Wayne Crue, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 205 days.

(21) Appl. No.: 09/683,187

(22) Filed: Nov. 29, 2001

(65) Prior Publication Data

US 2002/0131203 A1 Sep. 19, 2002

Related U.S. Application Data

(60) Provisional application No. 60/276,154, filed on Mar. 15, 2001.

(51) Int. Cl.[7] .................. G11B 5/127; G11B 5/147
(52) U.S. Cl. ..................... 360/125; 360/126
(58) Field of Search .................. 360/125, 126, 360/123, 317, 110

(56) References Cited

U.S. PATENT DOCUMENTS

| | | | | |
|---|---|---|---|---|
| 4,423,450 A | * | 12/1983 | Hamilton | 360/111 |
| 4,731,157 A | | 3/1988 | Lazzari | 216/22 |
| 4,901,179 A | * | 2/1990 | Satomi et al. | 360/126 |
| 5,157,570 A | * | 10/1992 | Shukovsky et al. | 360/126 |
| 5,311,387 A | * | 5/1994 | Mallary | 360/126 |
| 5,452,167 A | * | 9/1995 | Nago | 360/126 |
| 5,663,857 A | * | 9/1997 | Kumura et al. | 360/126 |
| 5,738,927 A | | 4/1998 | Nakamura et al. | 428/141 |
| 6,144,534 A | | 11/2000 | Xue et al. | 360/327.31 |
| 6,154,348 A | | 11/2000 | Suzuki | 360/324 |

(List continued on next page.)

FOREIGN PATENT DOCUMENTS

| | | | |
|---|---|---|---|
| JP | 59-65917 A | * | 4/1984 |
| JP | 2-235211 A | * | 9/1990 |
| JP | 7-135111 A | * | 5/1995 |

OTHER PUBLICATIONS

Abelmann, Leon, Khizroev, Sakhrat K., Litvinov, Dmitri, Zhu, Jian–Gang, Bain, James A., Kryder, Mark H., Ramstock, Klaus, Lodder, Cock, Micromagnetic simulation of an Ultrasmall single–pole perpendicular write head, Journal of Applied Physics, May 1, 2000, vol. 87, No. 9, pp. 6636–6638.

Khizroev, S.K., Jayasekara, W., Bain, J.A., Jones, Jr., R.E., Kryder, M.H., MFM *Quantification of Magnetic Fields Generated by Ultra–Small Single Pole Perpendicular Heads*, IEEE Transactions on Magnetics, Jul. 4, 1998, pp. 2030–2032, vol. 34, No. 4.

*Primary Examiner*—Julie Anne Watko
(74) *Attorney, Agent, or Firm*—Buchanan Ingersoll; Dennis Carleton

(57) ABSTRACT

A main write pole for a perpendicular recording head for use with magnetic recording media includes a main body portion of a material with a low magnetic moments, a trailing edge of a material having a high magnetic moment and a non-magnetic de-coupling layer therebetween. The strong magnetic recording field generated by the high moment magnetic material permits the use of a magnetic recording media having high anisotropy, thereby reducing super paramagnetic instabilities at high recording densities. Additionally, the high magnetic moment of the trailing edge, combined with the low magnetic moments of the remainder of the write pole, results in a highly localized magnetic recording field, thereby reducing the sensitivity of the recording process to the skew angle. Further, the de-coupling between the low and high magnetic moment portions of the write pole minimize the problem of magnetic remanence.

21 Claims, 5 Drawing Sheets

U.S. PATENT DOCUMENTS

| | | | |
|---|---|---|---|
| 6,166,539 A | 12/2000 | Dahlberg et al. | 324/252 |
| 6,233,166 B1 | 5/2001 | Fontan Tarodo | 363/142 |
| 6,243,288 B1 | 6/2001 | Ishikawa et al. | 365/158 |
| 6,256,222 B1 | 7/2001 | Sakakima et al. | 365/158 |
| 6,259,583 B1 * | 7/2001 | Fontana et al. | 360/126 |
| 6,270,588 B1 | 8/2001 | Takano et al. | 148/108 |
| 6,278,589 B1 | 8/2001 | Gill | 360/314 |
| 6,278,590 B1 | 8/2001 | Gill et al. | 560/243 |
| 6,307,708 B1 | 10/2001 | Yoda et al. | 360/126 |
| 6,313,973 B1 | 11/2001 | Fuke et al. | 360/324.1 |

* cited by examiner

COMPOSITE WRITE POLE FOR A MAGNETIC RECORDING HEAD

RELATED APPLICATIONS

Referenced-applications

This application claims the benefit of U.S. Provisional Application Serial No. 60/276,154 filed on Mar. 15, 2001.

FIELD OF THE INVENTION

The present invention relates to perpendicular recording heads for use with magnetic recording media. More specifically, the invention relates to heads having layers of low moment, non-magnetic and high moment materials within the main write pole to minimize the problem of magnetic remanence during transitions of the pole.

BACKGROUND OF THE INVENTION

Perpendicular recording heads for use with magnetic recording media typically include a pair of magnetically coupled poles, consisting of a main write pole having a small bottom surface area, and an opposing pole having a large bottom surface area. A coil is located adjacent to the main write pole, for inducing a magnetic field within the pole. A typical magnetic recording medium for use with such a recording head includes a recording layer having a plurality of magnetically permeable tracks, with each track divided into sectors. The tracks are separated by nonmagnetized transitions. A magnetically permeable lower layer, which is magnetically soft relative to the tracks, is located below the recording layer.

An important advantage of perpendicular recording is its ability to generate significantly stronger magnetic fields than longitudinal systems. Strong magnetic recording fields permit the use of high anisotropy magnetic recording media, thereby limiting superparamagnetic instabilities at high recording densities.

In some prior art embodiments of perpendicular recording heads, the opposing pole of the perpendicular write pole of the recording head can also form one of two substantially identical shields for the read elements, which are parallel to the trackwidth. The read element is located between these shields. Typical read elements include magneto-resistive (MR), giant magneto-resistive (GMR), spin valves, and tunnel magneto-resistive (TMR). A pair of electrical leads are located on opposing sides of the read elements to provide a sense current to the read elements.

The recording head is separated from the magnetic recording medium by a distance known as the flying height. The magnetic recording medium is moved past the recording head so that the recording head follows the tracks of the magnetic flux within the main write pole, causing the magnetic fields in the tracks to align with the magnetic flux of the main write pole. Changing the direction of electric current in the coil changes the direction of the flux created by the recording head, and therefore changes the magnetic fields within the magnetic recording medium. A binary "0" is recorded by maintaining a constant direction of magnetic flux through the main pole, and a binary "1" is recorded by changing the direction of magnetic flux through the main pole.

To read from the magnetic recording medium, the read element is separated from the magnetic recording medium by the flying height. The magnetic recording medium is moved past the read element so that the read element follows the tracks of the magnetic recording medium. As the magnetic recording medium passes under the read element, the magnetic fields within the recording medium orient the adjacent magnetic fields within the ferromagnetic read element layers so that they are either parallel (corresponding to minimum resistance) or anti-parallel (corresponding to maximum resistance), depending on the direction of the magnetic field being read from the recording medium. A sense current is passed through the read element by a pair of electrical contacts, thereby enabling the resistance of the read element to be detected. A constant level of resistance, whether the minimum resistance or the maximum resistance, is read as a binary "0". A changing level of resistance, regardless of whether the change is from minimum to maximum resistance or maximum to minimum resistance, is read as a binary "1".

FIG. 4 illustrates prior art write pole 64. The prior art main write pole 66 is typically made from a single material having a uniform magnetic moment. It is generally desirable to provide a sufficiently thick main write pole 66 to provide a sufficient channel for the magnetic flux for a strong magnetic field. As used herein, the thickness, designated by the arrow B, refers to the dimension of the main pole 66 that is substantially parallel to the track, and the main pole's width, designated by arrow C in FIG. 6, refers to the dimension of the main pole 66 parallel to the trackwidth. Typically, main pole 66 of composed of a material having a high saturation magnetic moment (M), thereby resulting in a strong magnetic write field. A strong magnetic write field permits use of a magnetic storage medium 16 having a high anisotropy, thereby limiting superparamagnetic instabilities at high recording densities.

The typical prior art write pole shown in FIG. 4 is limited by several difficulties. First, prior art write poles lack the ability to generate very localized magnetic recording fields at their trailing edge, which are important for minimizing the track width necessary to accommodate the skew angle. Further, presently available write poles exhibit magnetic remanence during transition of the write pole.

The geometry of the write pole is significant in the magnetic remanence problem. It is known that when the lateral dimensions of the pole tip become smaller than the height of the pole tip or when the dimensions of the pole tip become comparable to the domain wall thickness, the magnetization remanence of the recording tip becomes a significant factor in the performance of the write pole. A non-zero remanence causes non-linear head response, which leads to a number of technical difficulties, including data self-erasure, and non-linear transition shift.

The magnetic remanence problem is shown graphically in FIG. 1. FIG. 1($a$) shows an ideal graph of magnetic field (H) generated by application of a current through the coil versus magnetization of the write pole. Ideally, as the field increases either positively or negatively, the magnetization of the write pole increases until it reaches saturation magnetization ($M_S$). It is at or near this state that the write pole actually writes data onto the disc (usually the head during writing is slightly under-saturated). As the current is removed from the coil, the magnetization should ideally return to zero, as shown in FIG. 1($a$). However, often the actual behavior of the write pole can be as shown in FIG. 1($b$). As the field decreases, the magnetization of the write pole stays at or near the saturation point, instead of returning to zero, creating a hysteresis effect. To make the magnetization of the pole return to zero requires the application of a magnetic field in the opposite direction field. This problem can cause unwanted data to be written to the disc.

The magnetic remanence problem can usually be avoided by careful control of the magnetic domain structure within the pole tip. Unfortunately, this approach does not work when the geometry of the pole tip is such that the entire pole tip comprises a single magnetic domain.

Therefore, it would be desirable to have a write pole which is able to generate a strong magnetic recording field at the trailing edge of the write pole while minimizing the problem of magnetic remanence during transition of the pole.

SUMMARY OF INVENTION

The present invention is embodied as a perpendicular recording head having a main write pole consisting of a thin layer of material having a high magnetic moment which forms the trailing edge thereof, a layer of non-magnetic de-coupling material adjacent the trailing edge, and the remainder of the write pole and the opposing pole are composed of a material having a low magnetic moment.

The main body of the write pole of the recording head is made from material having a low magnetic moment. However, in drive designs where skew angle sensitivity is not a problem, a high-moment magnetic material can be used. A layer of de-coupling non-magnetic material is placed adjacent the main body portion. A trailing edge portion made from material having a high magnetic moment is placed adjacent the non-magnetic material opposite the main body portion. This structure provides the advantages of localizing a strong magnetic field in the region defined by the thickness of the high moment material at the write pole's trailing edge while at the same time minimizing the effects of magnetic remanence. The trailing edge portion and the main body portion are antiferromagnetically coupled via magneto-static or exchange interaction to minimize the total energy of the system. In drive designs where skew angle is a problem, the main body portion can be composed of a magnetic material having a low magnetic moment to minimize the problem.

The strong magnetic fields provided by this write pole structure permits the use of a magnetic recording media having a high anisotropy, thereby limiting super paramagnetic instabilities at high recording densities. Additionally, the highly localized magnetic field permits the use of a narrower trackwidth while avoiding problems created by the skew angle, because the trackwidth is required only to accommodate a small portion of the write pole instead of the entire write pole.

One embodiment of the present invention includes a recording head combining a read portion and a write portion. The write portion is generally of perpendicular configuration. A typical perpendicular recording head includes a main pole, an opposing pole magnetically coupled to the main pole, and an electrically conductive coil adjacent to the main pole. It is desirable that the flux be concentrated as it flows into or eui out of the main write pole and dispersed as is flows into or out of the opposing pole, to avoid having both poles write on the disc. Therefore, the air-bearing surface (bottom) of the opposing pole will typically have a surface area greatly exceeding the area of the air-bearing surface of the main write pole. Electrical current flowing through the coil creates a flux through the main write pole. The direction of the flux may be reversed by reversing the direction of current flow through the coil.

DETAILED DESCRIPTION

One embodiment of the present invention comprises perpendicular recording head for use with magnetic recording media, having a main write pole with a body portion made from a first material having a low magnetic moment, a magnetic field concentrating portion made from material having a high magnetic moment, and a non-magnetic de-coupling layer therebetween. As used herein, perpendicular recording means orienting the magnetic domains within the magnetic recording medium substantially perpendicular to the direction of travel of the recording head. As used herein, recording head is defined as a head capable of performing read and/or write operations, although the present invention is directed primarily towards the writing portion of the recording head.

Figure 1:
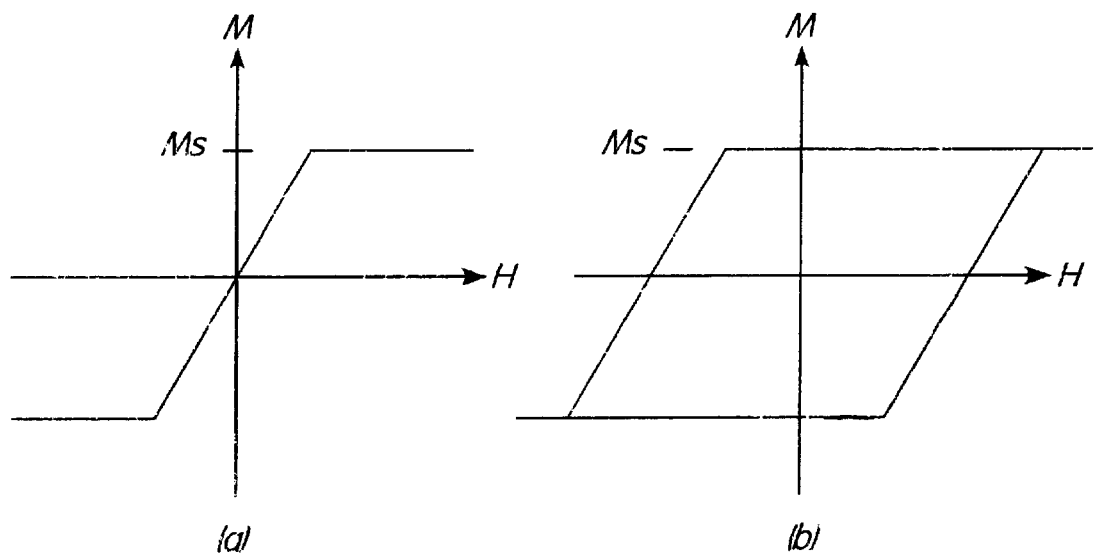
FIG. 1(a) shows a graph of magnetic field v. magnetism for an ideal write head.
FIG. 1(b) shows a graph of magnetic field v. magnetism for a write head exhibiting the described magnetic remanence problem.
Figure 2:
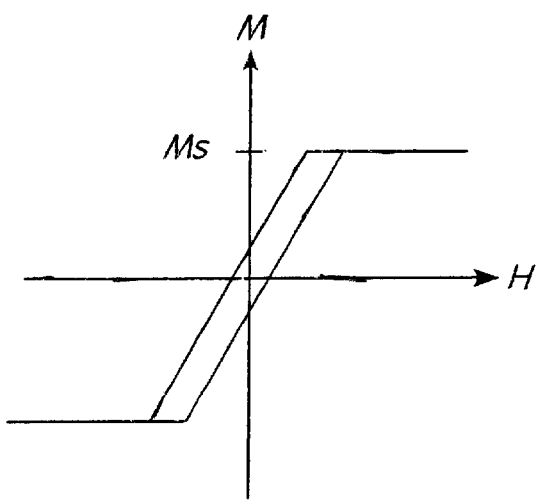
FIG. 2 shows a graph of the magnetic field v. magnetism for a write head of the present invention, showing the reduced magnetic remanence.
Figure 3:
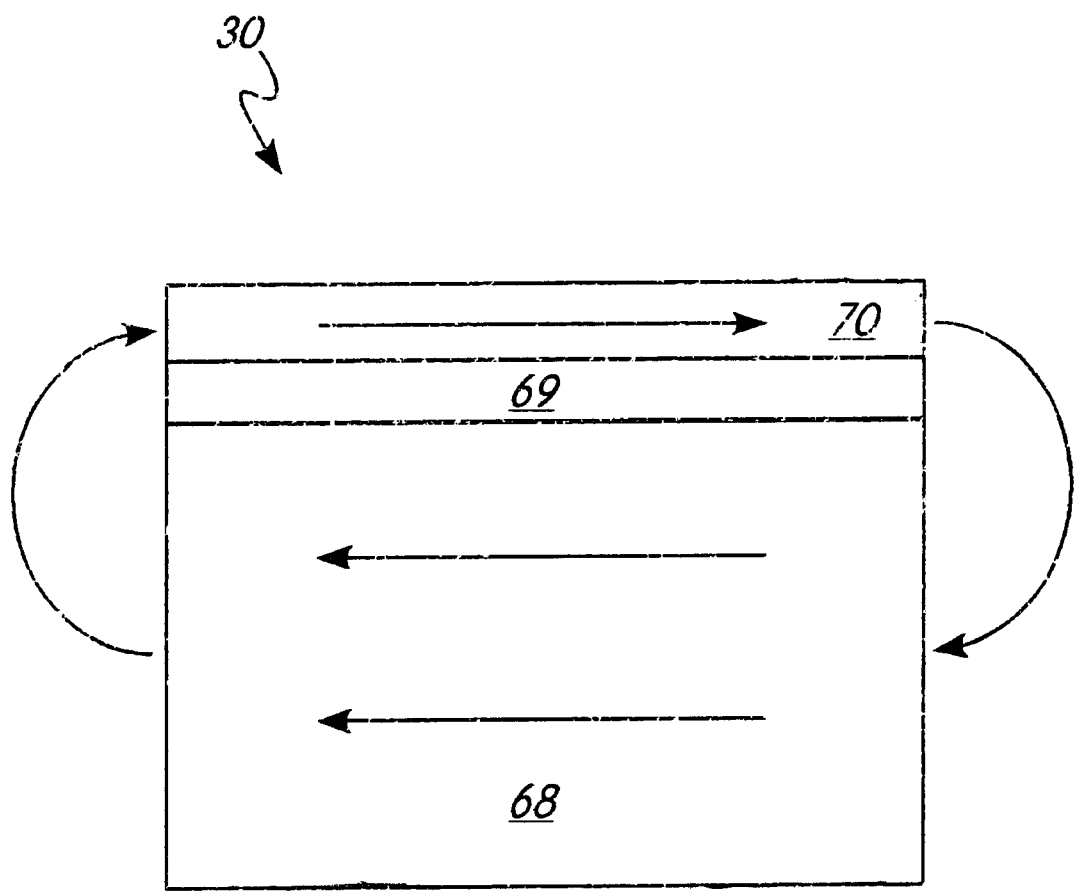
FIG. 3 shows a schematic of the magnetization distribution within the write pole of the present invention.
Figure 5:
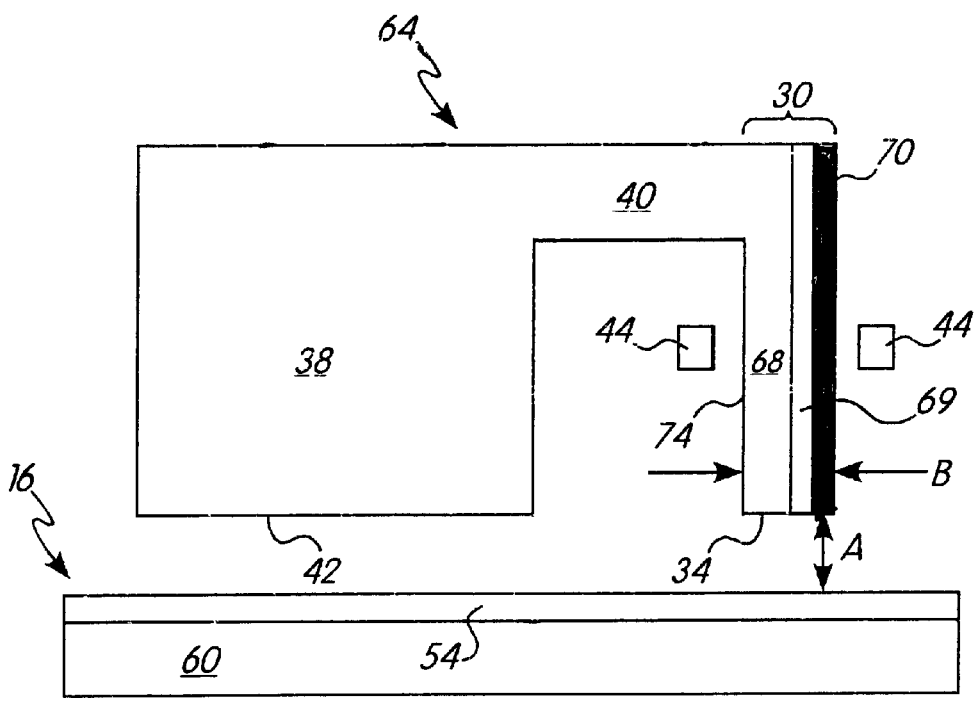
FIG. 5 shows a side view of a perpendicular write head according to this invention.
Figure 6:
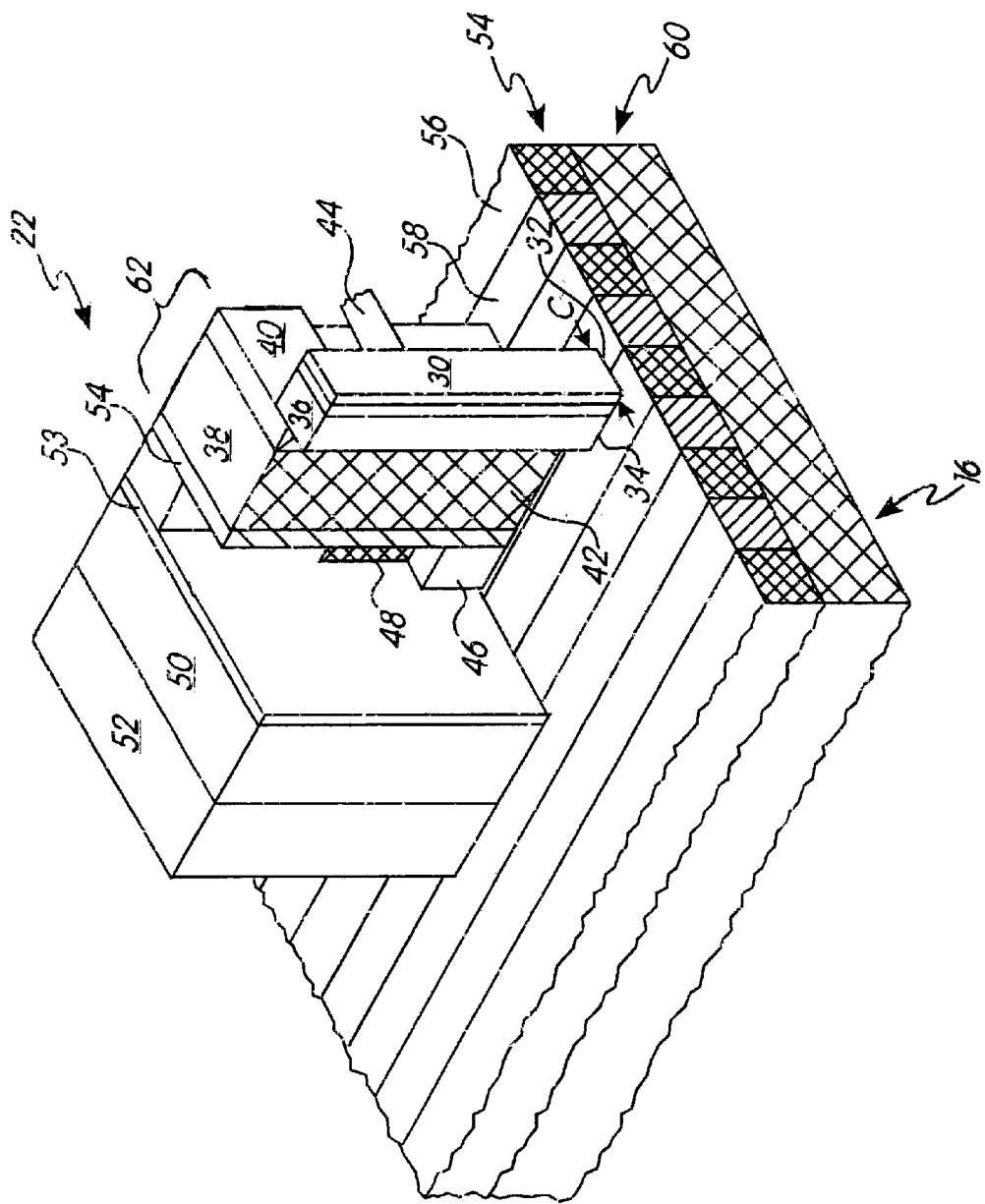
FIG. 6 shows a composite recording head with read and write elements.

The main write pole 30 of the present invention, shown in a side view in FIG. 5 and in perspective in FIG. 6, overcomes this disadvantage of the prior art through the use of three separate materials forming write pole 30. Main pole 30 includes a body portion 68 composed of a material having a low magnetic moment, de-coupling layer 69 composed of a non-magnetic material, and a magnetic field concentrating portion 70 composed of a material having a high magnetic moment. Main write pole 30 is shown schematically in FIG. 3. A sufficient thickness of low moment material 68 can be used to provide a suitably thick channel for a strong magnetic field. At the same time, the high moment material 70 deposited to form the magnetic field concentrating portion provides a strong localized magnetic field. De-coupling layer 69 allows the magnetizations of layers 68 and 70 to de-couple, allowing the system to seek its lowest energy state. The total energy of the system in the absence of an induced flux is minimized, thereby minimizing the magnetic remanence problem.

The de-coupling layer could be composed of Ta, Ru, Al or Cu, but many other non-magnetic materials could be used. Examples of material that may be used to form the body portion 68 includes NiFe permalloy alloys, such as NiFe and $Ni_{45}Fe_{55}$ CoZrNb alloys, CoZrTa alloys, and others. Permalloy will typically have a saturation magnetic field ($B_S$) of approximately 10 kG. $Ni_{45}Fe_{55}$ will typically have a $B_S$ of approximately 16 kG. CoZrNb and CoZrTa will typically have a $B_S$ of approximately 12 to 14 kG. Examples of material that may e used to form the magnetic field concentrating portion 70 include FeAlN alloys, FeTaN alloys, CoFe alloys, CoFeNi alloys, and others. FeAlN and FeTaN typically have a $B_S$ of approximately 19 to 20 kG. CoFe typically has a $B_S$ of approximately 25 kG. CoFeNi typically has a $B_S$ equal to approximately 20 kG.

Referring to FIG. 6, recording head 22 of the present invention is illustrated. Recording head 22 includes magnetically permeable main pole 30, oriented substantially perpendicular to magnetic recording medium 16, and having tip 32. Tip 32 includes bottom surface 34. Top 36 of main write pole 30 is magnetically coupled to opposing pole 38, possibly through joint 40. Opposing pole 38 includes bottom surface 42, which has a substantially larger surface area than bottom surface 34 of main write pole 30. Electrically conductive coil 44 is located adjacent main write pole 30, and is dimensioned and configured to induce a magnetic flux in main write pole 30. Coil 44 is surrounded by insulating material, as is well known in the art.

Located adjacent to opposing pole 38, opposite main write pole 30 and coil 44, is read element 46. Read element 46 is a giant magneto-resistive (GMR) read element, or a spin valve, but may be any other type of read element, such as a tunnel magneto-resistive (TMR) read element. If read element 46 is a GMR read element, permanent magnet 48 may be located in close proximity to provide the proper biasing for the GMR read element 46. Read element 46 is also located between a pair of opposing magnetic shields 53 and 54, with one magnetic shield formed by opposing pole 38 of main write pole 30, and the other magnetic shield designated by reference number 50. The entire recording head 22 is built up on substrate 52.

Figure 4:
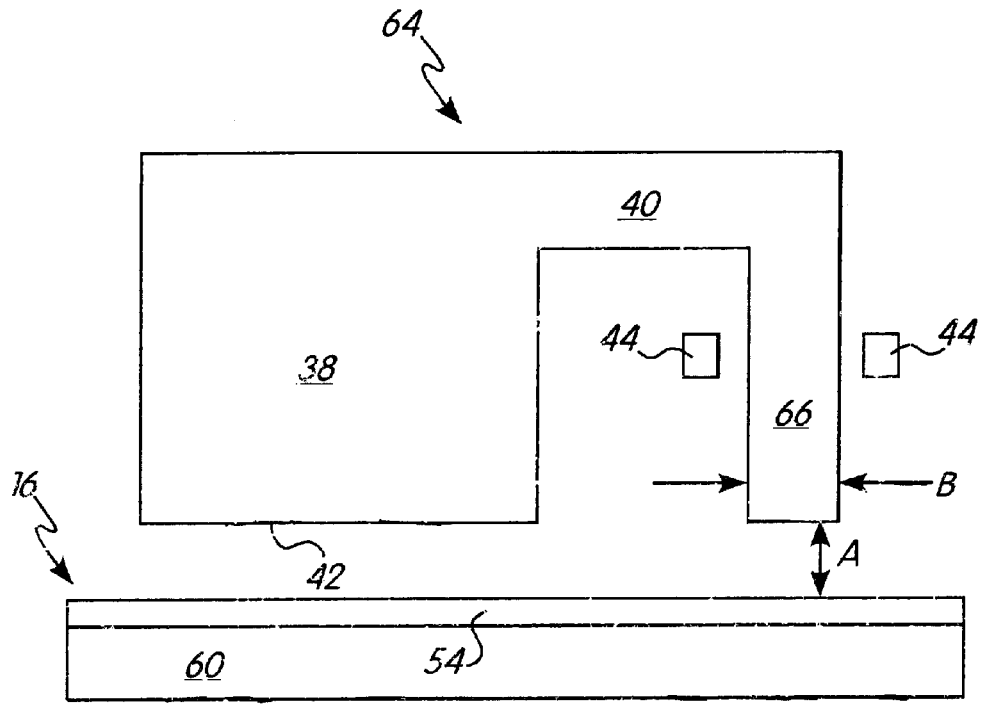
FIG. 4 shows a side view of a prior art perpendicular write head.

Continuing to refer to FIG. 6, magnetic storage medium 16, here a magnetic disc, for use with recording head 22 is illustrated. Magnetic storage medium 16 includes recording layer 54 having a plurality of magnetically permeable tracks 56, which are divided into sectors. Each sector has several different magnetic orientations within the magnetically permeable material (not shown, but well known in the art). Tracks 56 are separated by non-magnetized transitions 58. Magnetic storage medium 16 also includes magnetically permeable lower layer 60, which is magnetically soft relative to tracks 56. In use, magnetic storage medium 16 will be separated from tip 32 of main write pole 30 by a flying height A, as shown in FIGS. 4 and 5. Flying height A is sufficiently small such that a high concentration of flux from main write pole 30 will pass through tracks 56, but sufficiently large to prevent damage to magnetic storage medium 16 from contact with recording head 22.

Writing to magnetic storage medium 16 is best explained referring to FIG. 6. In the case of a disc, magnetic recording medium 16 is rotated relative to recording head 22 such that recording head 22 is located above the appropriate sectors of track 56. As recording progresses, magnetic recording medium 16 will move past recording head 22. Current will be supplied to coil 44, thereby inducing a magnetic field within main write pole 30. As a portion of the sector of track 56 passes under main write pole 30, the orientation of its magnetic field will correspond to the orientation of the magnetic field of main write pole 30. As main write pole 30 passes over magnetic recording medium 16, the direction of current passing through coil 44 will remain constant when a binary "0" is being recorded, thereby creating a consistent orientation of the magnetic fields within track 56. The current passing through coil 44 will reverse directions when a binary "1" is being recorded, thereby changing the orientation of a magnetic field within track 56.

Reading from magnetic recording medium 16 is accomplished by passing it under recording head 22 such that track 56 of magnetic storage medium 16 passes under read element 46. The sector of track 56 directly under read element 46 will be read. The magnetic fields within track 56 directly underneath read element 46 will be oriented either up or down. Depending on the type of read element 46 used, the magnetizations within at least some of the ferromagnetic layers will rotate to correspond to the magnetizations within the domain of track 56 currently being read.

The magnetizations within the layers of read element 46 will therefore be oriented either parallel (corresponding to minimum resistance) or antiparallel (corresponding to maximum resistance). A sense current is applied to sense the resistance of read element 46. A constant level of resistance, regardless of whether that level of resistance is the minimum or maximum level, is interpreted as a binary "0". Similarly, a change in the level of resistance from minimum to maximum, or from maximum to minimum, is read as binary "1".

Figure 7:
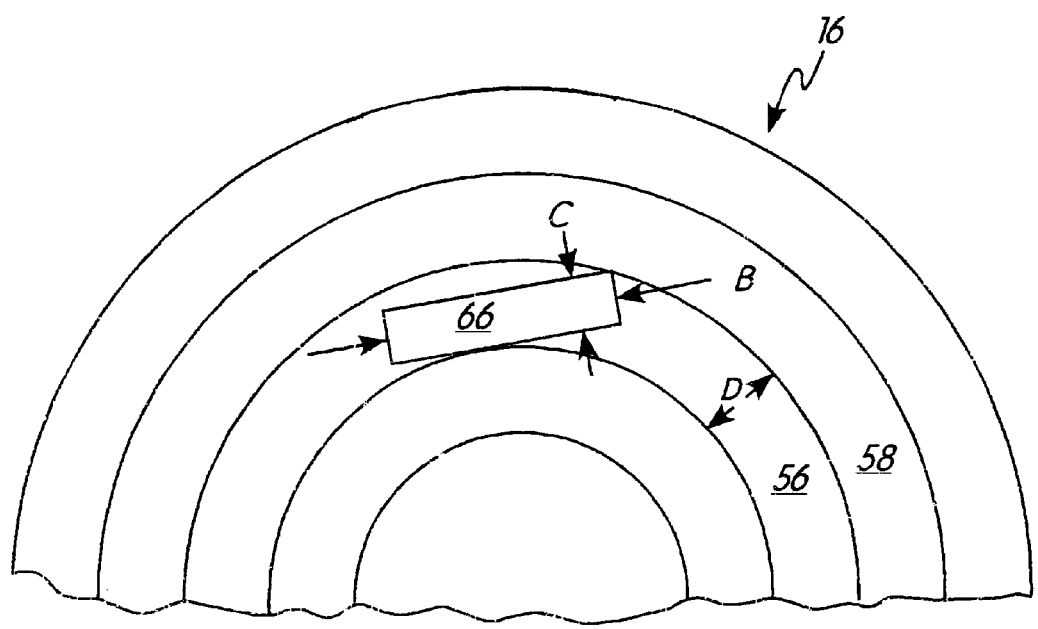
FIG. 7 shows a top view of a magnetic recording disc of the prior art showing the skew angle problem.
Figure 8:
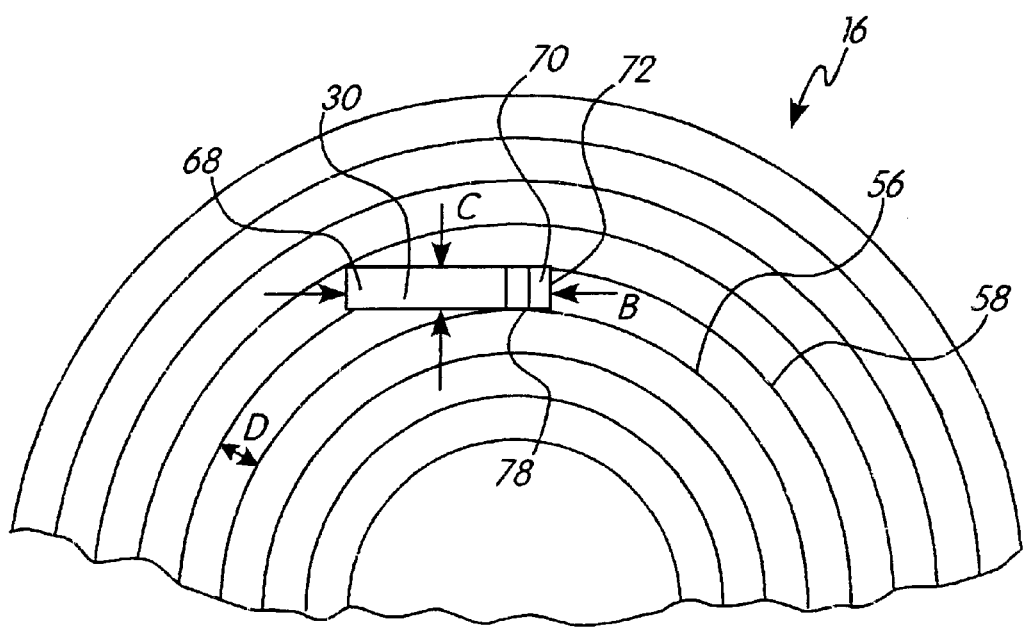
FIG. 8 shows the top view of a magnetic recording disc utilizing the solution to the skew angle problem according to the present invention.

FIG. 7 shows skew angle problem inherent in the prior art. In FIG. 8, the advantage of the present invention in minimizing the effects of the skew angle is illustrated. It is well known that as the arm of a computer hard disc rotates to move recording head 22 from track to track, recording head 22 will be angled with respect to at least some of the tracks. As illustrated in FIG. 7, trackwidth D must be sufficient to accommodate the width C of main pole 66 across its entire thickness B. Contrast this with main write pole 30 of the present invention, illustrated in FIG. 8. The illustrated embodiment includes the magnetic field concentrating portion 70 at the trailing edge 72. Main write pole 30 works on the principal of "trailing edge" writing, meaning that the orientation of the magnetization within main write pole 30 when the trailing edge 72 passes a magnetic domain within track 56 will ultimately be the orientation of the magnetization within that domain of track 56. The magnetic field concentrating portion 70 located at trailing edge 72 of main write pole 30 results in a highly localized magnetic field. Therefore, trackwidth D need not be any wider than necessary to accommodate magnetic field concentrating portion 70, as opposed to thickness B of the entire write pole 30. Therefore, as the arm swings, creating a skew angle between recording head 22 and track 56, a narrower track 56 can accommodate main write pole 30 even when the skew angle is taken into account.

While a specific embodiment of the invention has been described in detail, it will be appreciated by those skilled in the art that various embodiments and modifications, alternatives to the details presented herein could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A recording head for use with magnetic medium comprising:
   a main write pole comprising:
      a first portion comprising a magnetic material having a magnetic moment;
      a decoupling portion comprising a layer of non-magnetic material adjoining said first portion; and
      a second portion adjoining said decoupling portion opposite said first portion, said second portion comprising a layer of magnetic material having a magnetic moment which is lower than said magnetic moment of said first portion; and
   an opposing pole magnetically coupled to said main pole, said opposing pole being sufficiently larger than said main write pole such that magnetic flux flowing into or out of said opposing pole is dispersed.

2. The recording head of claim 1 wherein said first portion has a magnetic moment which is sufficiently high to generate a recording field necessary to write on said magnetic medium.

3. The recording head of claim 1 wherein said opposing pole is comprised of the same magnetic material as said second portion.

4. The recording head of claim 3 wherein the area of the air-bearing surface of said main write pole is smaller than the area of the air-bearing surface of said opposing pole.

5. The recording head of claim 1 further comprising a coil capable of inducing a magnetic flux in said main write pole when a current is passed therethrough.

6. The recording head of claim 5 wherein said first portion is the trailing edge of said main write pole with respect to said magnetic medium and further wherein said magnetic flux is concentrated at said trailing edge.

7. The recording head of claim 1 wherein said first portion and said second portion are antiferromagnetically coupled to minimize the total energy of the system in the absence of an induced flux.

8. The recording head of claim 1 wherein said first portion is composed of an alloy selected from a group consisting of NiFe, CoZrNb and CoZrTa.

9. The recording head of claim 1 wherein said second portion is composed of a material selected from the group consisting of tantalum and copper.

10. The recording head of claim 1 wherein said third portion is composed of an alloy selected from a group consisting of FeAlN, FeTaN, CoFe and CoFeNi.

11. The recording head of claim 1 wherein the saturation magnetic field of said first portion is 16 kG or less.

12. The recording head of claim 1 wherein the saturation magnetic field of said second portion is 16 kG or more.

13. The recording head of claim 1 further comprising a read element.

14. The recording head of claim 13 wherein said read element is of a type selected from a group consisting of giant magneto-resistive, spin valve and tunnel magneto-resistive.

15. A disc drive system having a magnetic medium and a recording head for writing to said magnetic medium, said recording head having a main write pole comprising:

a first portion comprising a magnetic material having a magnetic moment;

a decoupling portion comprising a layer of non-magnetic material adjoining said first portion; and a second portion adjoining said decoupling portion opposite said first portion, said second portion comprising a layer of magnetic material having a magnetic moment which is lower than said magnetic moment of said first portion and an opposing pole magnetically coupled to said main pole, said opposing pole being sufficiently larger than said main write pole such that magnetic flux flowing into or out of said opposing pole is dispersed.

16. The disc drive system of claim 15 wherein said first portion of said main write pole has a magnetic moment which is sufficiently high to generate a recording field necessary to write on said magnetic medium.

17. The disc drive system of claim 15 wherein:

said first portion of said main write pole has a first saturation magnetic field;

said second portion of said main write pole has a second saturation magnetic field;

which is greater than said first saturation magnetic field.

18. The disc drive system of claim 15 wherein said first and said second portions of said main write pole are magnetically de-coupled such that the respective magnetizations of said first and said second portions are oriented in an anti-parallel relation ship with respect to each other.

19. The disc drive system of claim 15 further comprising:

a coil capable of inducing a magnetic flux in said main write pole when a current is passed therethrough;

wherein said magnetic flux in said main write pole returns to zero when said current is removed from said coil.

20. The disc drive system of claim 20 wherein said first portion and said second portion are antiferromagnetically coupled to minimize the total energy of the system in the absence of an induced flux.

21. The disk drive system of claim 19 further comprising a read head for reading data from said disc.

* * * * *